Aug. 17, 1965  H. A. GORJANC  3,200,766
CARRIER SYSTEMS
Filed May 27, 1960  4 Sheets-Sheet 1

INVENTOR.
HENRY A. GORJANC
BY Hudson Boughton
Williams, David & Hoffmann
ATTORNEYS

Aug. 17, 1965  H. A. GORJANC  3,200,766
CARRIER SYSTEMS
Filed May 27, 1960  4 Sheets-Sheet 3

INVENTOR.
HENRY A. GORJANC
BY Hudson, Doughton,
Williams, David & Hoffmann
ATTORNEYS

FIG.8

United States Patent Office 3,200,766
Patented Aug. 17, 1965

3,200,766
CARRIER SYSTEMS
Henry A. Gorjanc, Wickliffe, Ohio, assignor to The Cleveland Crane & Engineering Company, Wickliffe, Ohio, a corporation of Ohio
Filed May 27, 1960, Ser. No. 32,388
4 Claims. (Cl. 104—88)

The present invention relates to material handling equipment and particularly to carrier systems incorporating a self-propelled electrically-powered carrier movable along a trackway.

One of the principal objects of the invention is the provision of a novel and improved carrier system including a trackway comprising a closed loop, a power propelled carrier supported on and movable along the trackway, a plurality of groups of control areas along the trackway at which control areas a carrier controlling operation such as a track switching function or a carrier operating function, or at which an off track function, such as stopping or starting a piece of equipment adjacent to the track may be performed, a carrier mounted stepping relay for counting the control areas, and means for automatically effecting a selected operation and for resetting the stepping relay after a preselected number of control areas of a group has been counted.

Another object of the invention is the provision of a novel and improved carrier system including a trackway comprising a closed loop, a power propelled carrier supported on and movable along the trackway, a plurality of groups of control areas along the trackway at each of which control areas a carrier controlling operation such as a track switching function or a carrier operating function, or at which an off track function such as stopping or starting a piece of equipment adjacent to the track may be performed, a carrier mounted stepping relay for counting the control areas, carrier mounted selector means for selecting a count of control areas of each group at which counts selected operations are to be performed, and means for resetting the stepping relay each time the relay has made a selected count.

A further object of the invention is the provision of a system of the character referred to including a group selecting stepping relay for selectively connecting the control area selecting stepping relay for operation with the different selector means in carrier controlling circuits and means for automatically stepping the group selecting relay each time the control area stepping relay has made a selected count.

Another object of the invention is the provision of a novel and improved carrier system including a trackway comprising a closed loop, a power propelled carrier supported on and movable along the trackway, a loading station and a plurality of work stations along the trackway, means for dispatching the carrier to any one of said stations from any other of said stations and means for automatically causing the carrier to travel directly to the loading station from any of the work stations to initiate a carrier operation or an off track operation at the selected station if and as desired.

Another object of the invention is the provision of a novel and improved carrier system including a trackway having a main track and a branch track branching therefrom and exiting onto the main track, a plurality of power propelled carriers supported on and movable along the trackway, a track switch at the exit of the branch track and means for controlling movements of the carriers as they approach the track switch at the exit of the branch track from the main track and from the branch track so as to prevent interference therebetween.

Another object of the invention is the provision of a novel and improved carrier system including a trackway, a plurality of power propelled carriers supported on and movable along the trackway, a movable track switch, a carrier blocking system adjacent the track switch and control switches operated in response to movement of the track switch, one control switch being employed solely to control the blocking system and the other control switch being employed solely for controlling the circuit which actuates the track switch.

The invention further resides in certain novel features of construction, combinations and arrangements of parts, and further objects and advantages of the invention will be apparent from the following description of the preferred embodiment described with reference to the accompanying drawings forming a part of this specification in which similar reference characters designate corresponding parts and in which:

While a particular carrier system is shown in the drawings and hereinafter described, it is to be understood that the invention is susceptible of other embodiments, constructions and arrangements and is particularly applicable to systems wherein a self-propelled carrier is to be selectively dispatched from any one of a plurality of stations along a trackway to another of the stations.

In general, the carrier system of the present invention includes a carrier adapted to be selectively dispatched along a trackway from a loading station to any one of a plurality of work stations along the trackway and/or from any one of the work stations to another of the work stations. The routing and station selection of the carrier is controlled by means at control areas along the trackway and by means on the carrier including preselect means settable by an operator for permitting the selection of a station to which the carrier is to be dispatched and means including a resettable stepping relay actuated by means at the control areas. The trackway preferably comprises a closed loop and the carrier includes means for automatically dispatching the carrier directly to the loading station from any one of the work stations. Where track switches are employed the invention also contemplates an improved carrier blocking system in association with the track entrance and track exit switches to control movements of the carriers as they approach the track switches.

Figure 1:
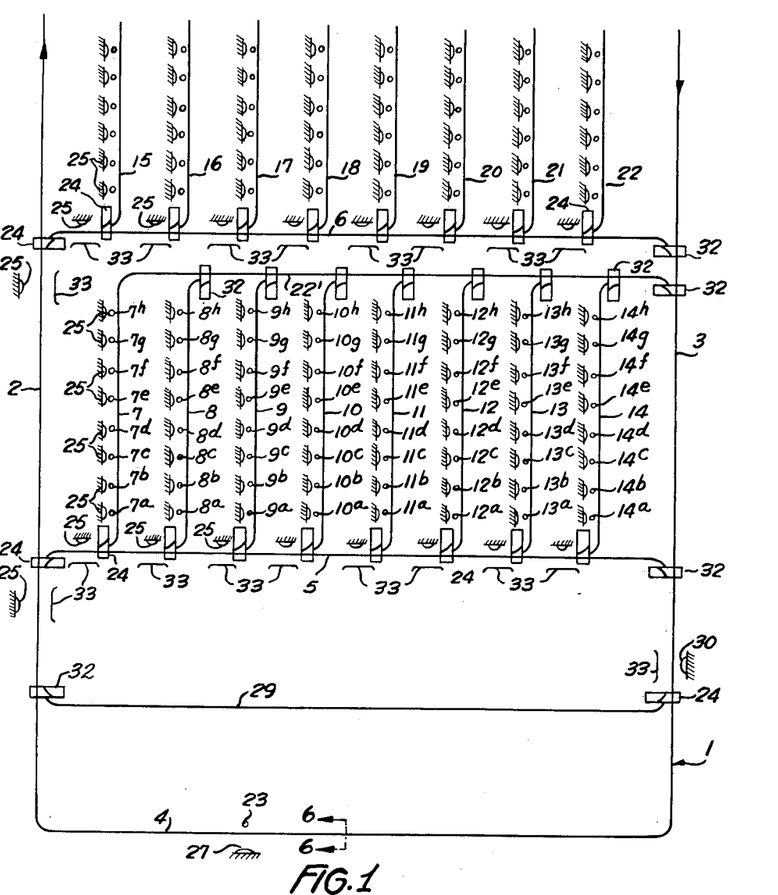
FIG. 1 is a plan view of a portion of a trackway of an overhead monorail system embodying the invention and having a main track, branch tracks and subbranch tracks.

Referring to the drawings, there is shown in FIG. 1 a portion of a trackway, represented generally by the numeral 1, of a carrier system in which the invention is embodied. The trackway shown is of the inverted T-shaped overhead monorail type and is adapted to be traveled in a clockwise direction by one or more self-propelled carriers and comprises a substantially rectangular main track including side sections 2 and 3 connected by two end sections only one of which designated by the numeral 4 is illustrated. The trackway also includes branch tracks 5 and 6 extending from the main track section 2 to the main track section 3 and subbranch tracks 7 through 14 and 15 through 22 extending respectively from the branch tracks 5 and 6.

The subbranch tracks 7 through 14 are connected to a track section 22' leading into the section 3 of the main track. The subbranch tracks 15 through 22 are connected to a track section (not shown) similar to the track section 22'.

Two branch tracks and eight subbranch tracks extending from each branch track are illustrated but any desired track arrangement of main tracks, branch tracks, subbranch tracks and/or sub-subbranch tracks, etc. may be employed. The branch tracks 5 and 6 are connected to the main track sections 2 and 3, the subbranch tracks are connected to the branch tracks and to the sections 22', and the sections 22' are connected to the main track section 3 by movable track switches to form closed loops in the trackway.

A plurality of work stations are positioned along the subbranch tracks at each of which an operation with respect to a carrier may be performed such as stopping the carrier. These stations, of which there are eight along each of the subbranch tracks 7 through 14, are represented by circles. The stations or circles along the subbranch tracks 7 through 14 are designated by the reference numerals which designate the associated branch tracks having the suffixes a through h affixed thereto. Six stations represented by circles are shown along each of the subbranch tracks 15 through 22. It is understood that as many stations as desired may be employed.

A carrier loading station represented by a circle 23 is adjacent the track section 4 at which station material may be loaded into the carrier. The carriers are normally dispatched from the station 23 to one of the work stations along the subbranch tracks. As will appear hereinafter the carriers may also be dispatched to the station 23 from any one of the work stations or may be dispatched from one work station to another work station. Alternatively, some other operations may be performed at the tation 23 such as unloading of the carriers.

When a plurality of carriers are utilized it is desirable that a carrier blocking system be employed adjacent the main track section 4. Such a blocking system prevents collision of carriers returning to the section 4 with carriers on the section 4 awaiting to be dispatched. The blocking system may include a selectively energizable and de-energizable insulated section of conductor bar (not shown) along the section 4 which is contacted by trolleys on carriers entering the section 4 from the section 3. An arrangement may be employed wherein the insulated section is de-energized by a carrier at the station 23 so that carriers behind the carrier at the station 23 are stopped and can only be moved toward the station 23 when the insulated section is energized in response to dispatch of a carrier at the station 23.

Control areas are spaced along the main track section 2 each of which includes means for controlling routing of a carrier. More specifically, there is a group of control areas along the section 2 each including a movable two-way track switch 24 at the entrance to a separate branch track. Only two such areas are shown, one at the entrance end of each of the branch tracks 5 and 6. These control areas also include switch trippers 25 positioned in advance of the switches 24 for actuating or tripping a switch 26 mounted on the carrier for controlling operation of the switches 24.

There are also separate groups of control areas along the branch tracks. The control areas of these groups include track switches 24 at the entrances to the subbranch tracks 7 through 22 and switch trippers 25 positioned in advance of these switches for actuating the switch 26. Additional groups of control areas are located along the subbranch tracks and these control areas include trippers 25 adjacent the stations along the subbranch tracks for actuating the switch 26 to effect stopping of the carrier as will presently appear.

A single control area is located along the track section 4 and includes a tripper 27 positioned adjacent the station 23 for actuating a switch 28 on the carrier to stop the carrier at the station 23. A bypass track 29 is connected to the main track section between the section 4 and the branch track 5 for permitting a carrier to bypass the station 23. There is also a single control area along the main track section 3 which includes a track switch 24 at the entrance to the bypass track 29 and a tripper 30 in advance of the track switch for actuating a switch 31 on the carrier to control operation of the track switch at the entrance to the bypass track 29. Movable two-way track switches 32 are positioned at the exits of the branch tracks, the subbranch tracks, except the subbranch track 7, the bypass track and the tracks 22'.

The track switches 24 and 32 are similar in construction in that they each have a straight track segment and a curved track segment. The switches 24 and 32 are each movable between a first position wherein the straight track segment thereof is aligned with one associated track section and the curved track segment thereof is misaligned with the other associated track section and a second position wherein the curved track segment thereof is aligned with the other associated track section and the straight track segment thereof is misaligned with the one associated track section.

The control areas along the main track sections 2 and 3 and along the branch tracks each includes a conductive segment 33 positioned in advance of the track entrance switches 24. Each of the segments 33 is connected to the control circuit for the associated track entrance switch 24. The segments 33 may comprise parts of a continuous conductor bar or may constitute separate conductors as shown and are arranged to be engaged by a conductive outrigger collector shoe 34 mounted on a carrier. As will presently appear, a segment 33 is engaged by the collector shoe 34 at the same time that a tripper 25 actuates the switch 26 on the carrier. When the shoe 34 engages one of the segments 33 at a selected control area and when the adjacent tripper 25 actuates the carrier-mounted switch 26, the actuating means for the adjacent entrance switch is energized to effect movement of the entrance switch. Such actuating means comprises a single phase reversible electric motor 35 which when rotated in one direction moves the entrance switch to one of its positions and which when rotated in the opposite direction moves the entrance switch to the other of its positions. Obviously it is necessary that the trippers 25 and the segments 33 be spaced in advance of the associated entrance track switches a distance sufficient to allow the entrance track switches to complete their movement from one position to the other prior to the entrance of a carrier thereonto.

The switches 24 and 32 are shown in their normal straight track positions so that carriers moving along the track sections 2 and 3 would normally pass through the switches 24 and 32 and continue along the sections 2 and 3. It is to be understood, however, that if the majority of the carriers are to be diverted by a track entrance switch onto a branch track then the switches 24 and 32 are normally positioned in their curved track positions.

Since all of the track switches are of identical construction, only the track switch 24 at the entrance to the branch track 5 will be described. When the shoe 34 on the carrier is energized, as will presently appear, and engages a selected one of the segments 33, or when an operator closes a manually operated switch 35', which switch may be located at any convenient place adjacent to the track, current flows through a coil 36 of a relay in the control circuit of the entrance switch, see FIG. 2. This relay includes normally open contacts 36–1, 36–2 and 36–3 which are temporarily closed in response to energization of the relay coil 36. Closure of the contacts 36–1 establishes a holding circuit for the relay coil 36 and closure of the contacts 36–2 and 36–3 connects the motor 35 to the conductors L2 and L3 which results in energization of the motor for operation in the direction to shift the track switch to its curved track position. These conductors are coextenive with the trackway and form part of an electrical system consisting also of a conductor L1 which is the monorail track.

The motor 35 is mounted on a stationary frame 37 and is effective when energized to displace a movable frame 38 which carries the entrance track switch 24. Such displacement is effected through a sprocket chain segment 39 which is passed over a sprocket wheel 40 fixed to the drive shaft of the motor 35. The chain segment 39 also passes over an idler sprocket wheel 41 supported by the outer frame 37. The two ends of the chain segment 39 are rigidly secured to the movable frame 38 in spaced relation so that when the sprocket wheel 40 rotates in a clockwise direction as viewed in FIG. 2 the chain 39 displaces the switch 24 so that the curved track segment is moved upwardly into a position permitting a carrier to pass from the track section 2 onto the branch track 5.

Figure 2:
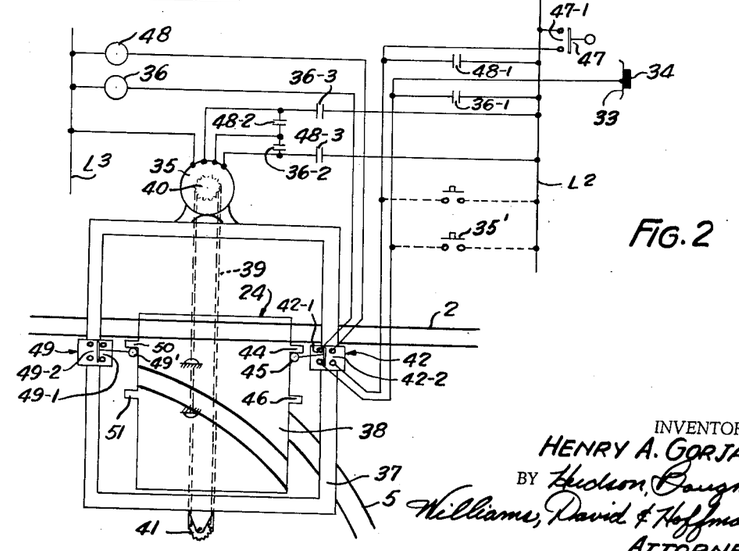
FIG. 2 is a detailed plan view of a track entrance switch including an across-the-line diagram of the motor circuit.

A control switch 42 preferably mounted by the frame 37 is actuated in response to movement of the track switch 24. The control switch 42 includes normally closed contacts 42–1 and normally open contacts 42–2 which are included in circuits forming part of the control circuit for the entrance switch 24.

When the motor 35 is energized and the movable frame 38 is displaced upwardly relative to the stationary frame 37 as viewed in FIG. 2, a tripper 44 carried by the frame 38 is also moved upwardly out of engagement with a wheeled follower 45 forming part of the switch 42. Continued movement of the frame 38 causes a tripper 46 carried by the frame 38 to engage the follower 45, which opens the contacts 42–1 to effect deenergization of the motor 35 when the track switch 24 arrives at its curved track position. At the same time the contacts 42–2 are closed to prepare the motor circuit for energizing the motor 35 to cause a reverse displacement of the switch 24 downwardly as viewed in FIG. 2. The contacts 42–1 are not open until the track switch 24 has completed its movement to the curved track position, at which time the contacts 42–2 are closed.

In order to return the track switch 24 to its normal straight position from its curved position a tripper (not shown) on the carrier engages a switch 47 (FIGS. 2 and 3) fixedly mounted along the branch track 5. Such engagement results in closing of normally open contacts 47–1 of the switch 47 and energization of a coil 48 of a relay, which coil is connected across the conductors L2 and L3 through the now closed contacts 42–2. This relay includes normally open contacts 48–1, 48–2 and 48–3 which are closed when coil 48 is energized. Contacts 48–1 form a holding circuit for coil 48 and contacts 48–2 and 48–3 establish a circuit to effect energization of the motor 35 such that the motor rotates in the opposite direction from that effected by energization of the relay coil 36. The contacts of the relays having the coils 36 and 48 are preferably mechanically interlocked so that the closing of the contacts of one of these relays is accompanied by opening of the contacts of the other of these relays.

The contacts 42–2 of the switch 42 are opened in response to completion of movement of the track switch 24 to its normal straight track position. At the same time the contacts 42–1 are closed and the circuit for motor 35 is thereby prepared for energization in response to arrival of the next carrier. As will presently appear, the exit track switches 32 are controlled by switches arranged to be tripped by an actuator on a passing carrier. Switches are employed in place of segments 33 for controlling the exit track switches inasmuch as there is no selection problem regarding the exit switches since there is only one exit from each branch track and subbranch track. The tripping of such switches results in the energization of the relay coil 36 in the manner described in connection with the employment of the segments 33.

In the event that a plurality of carriers are to travel simultaneously along the trackway it is necessary to provide a priority system to prevent collision of the carriers and to prevent entry of a carrier onto a track switch which is not positioned to properly allow such entry. The priority or blocking system includes insulated sections or segments of conductor bars in the conductors L2 and/or L3 of the electrical system. The blocking segments can be selectively energized or deenergized and are located adjacent the entrance of each track entrance switch and track exit switch. The blocking conductor segments are preferably isolated from the remainder of the conductors by insulating sections. However, it is to be understood that other means may be employed. The electrical power for the insulated conductor segments is supplied under the control of a jumper system described hereinafter.

Figure 3:
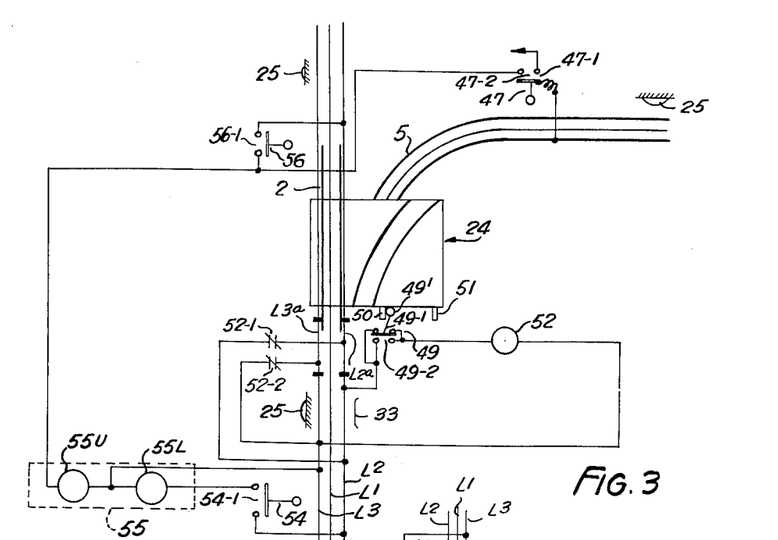
FIG. 3 is a schematic electrical diagram of a blocking system associated with a track entrance switch in the trackway of FIG. 1.
Figures 4, 9:
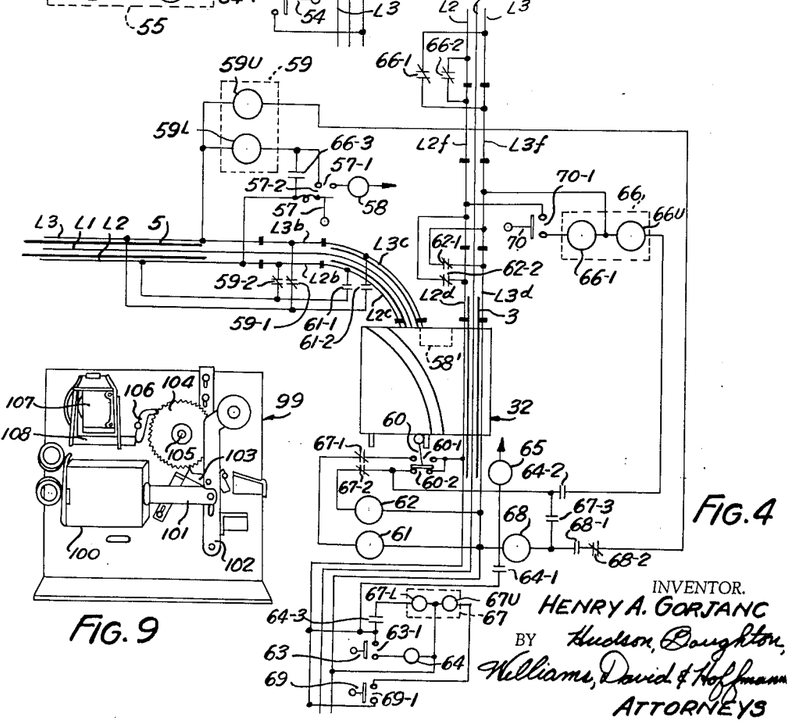
FIG. 4 is a schematic electrical diagram of a blocking system associated with a track exit switch in the trackway of FIG. 1.
FIG. 9 is an elevational view of one of the ratchet type stepping relays with a reset mechanism employed in the carrier shown in FIG. 6.
Figure 5A:
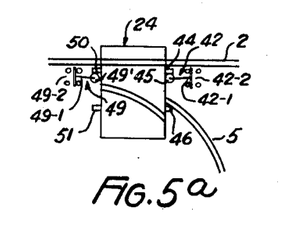
FIGS. 5a, 5b, and 5c are schematic representations of the track switch of FIG. 2 shown respectively in straight or main track position, an intermediate position between straight track and curved or branch track position and curved track position.
Figure 5B:
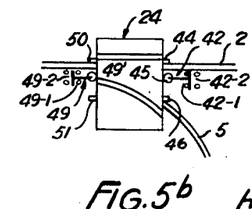
Figure 5C:
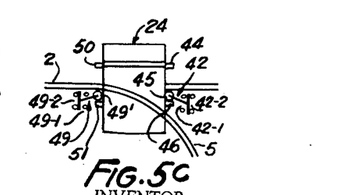

FIGS. 3 and 4 illustrate respectively the blocking system adjacent the track entrance and exit switches. The particular switches shown are the track switch 24 at the entrance to the branch track 5 and the track switch 32 at the exit of the branch track 5. The track entrance switch 24 includes a switch 49 which is operated in response to movement of the track entrance switch 24 and forms part of the blocking system to prevent carriers from entering the entrance switch when the entrance switch is not properly positioned. The switch 49 includes a wheeled follower 49' adapted for engagement by trippers 50 and 51 carried by the movable frame 38. When the motor 35 is energized to move the switch 24 to its curved track position the tripper 50 is moved out of engagement with the follower 49' and the contacts 49–1 are immediately opened as shown in FIG. 5b. When the switch 24 arrives at its curved track position as illustrated in FIG. 5c the contacts 49–2 are closed. It is noted that operation of the switch 49 is different from that of the switch 42, previously referred to, in that the contacts 42–1 of the switch 42 remain closed during movement of the switch 24 so that the motor 35 is continuously energized during such movement.

In FIG. 3 a jumper circuit is connected to supply electrical power from the conductors L2 and L3 to insulated conductor segments L2a and L3a positioned in advance of the track switch 24. The jumper circuit is selectively closed and interrupted under control of a relay having a coil 52 which controls contacts 52–1 and 52–2 which are normally closed when the switch 24 is in its straight track position. It is noted that the relay coil 52 is connected for energization from the conductors L2 and L3 under the control of the switch 49 and that when the entrance switch 24 is in its illustrated normal straight track position the relay coil 52 is energized through the closed contacts 44 so that contacts 52–1 and 52–2 are closed. As a result, electrical power is normally supplied to the conductor segments L2a and L3a and a carrier approaching the switch 24 may pass therethrough.

When electrical current is supplied to the segment 33 as previously explained, the motor 35 is energized to move the switch 24 to its curved position, which is in a direction from right to left as viewed in FIG. 3. During such movement of the switch 24 the contacts 49–1 of the switch 49 are opened to deenergize the relay coil 52 for opening the contacts 52–1 and 52–2. As a result the segments L2a and L3a are deenergized and the carrier is stopped short of the switch 24 if the track switch has not completed its shifting operation by the time a carrier reaches the deenergized segments inasmuch as electrical power is no longer available for driving the carrier past the deenergized segments L2a and L3a.

When the switch 24 arrives at its curved position the contacts 49–2 are closed and the relay coil 52 is again energized to effect energization of the segments L2a and L3a thus causing movement of the carrier through the switch 24 onto the branch track 5. When the carrier has entered the branch track 5 an actuator on the carrier actuates the switch 47 to close contacts 47–1 and effect energization of the relay coil 36 through now closed contacts 42–2 of the switch 42 to energize the motor 35. When the motor 35 is so energized the switch 24 is moved from the curved position back to the normal straight position.

The system also includes a blocking arrangement for maintaining a conductor segment deenergized behind a carrier which is stopped prior to entering a track switch so as to prevent a following carrier from colliding with the stopped carrier. For this purpose a switch 54 is positioned in advance of the entrance switch to be actuated by a carrier mounted actuator in response to the movement of a carrier. The switch 54 includes normally open contacts 54–1 which are closed when the switch 54 is actuated to control energization of a latch type relay having a latching coil 55L and an unlatching coil 55U. This relay is represented by the broken line rectangle 55 which surrounds the coils 55L and 55U. Other latch type relays in the system and referred to hereinafter are also represented by broken line rectangles surrounding the coils thereof. When the contacts 54–1 are closed the coil 55L is energized to effect deenergization of insulated conductor segments (not shown), positioned in advance of the entrance switch. As the carrier passes over the entrance switch in either the straight track position or curved track position a switch 56 or the switch 53 is actuated to close contacts 56–1 or 53–2 to effect energization of the coil 55U to unlatch the relay 55 and effect energization of the segments in front of the entrance switch. Blocking systems similar to that described may be associated with the remaining track entrance switches.

Operation of the exit switches 32 is similar to that of the entrance switches 24. The blocking system associated with the exit switch, however, is different from that associated with the entrance switches inasmuch as there are two approaches to each of the exit switches.

In general, the blocking system for an exit switch is arranged to control movement of the carriers in such a manner that carriers approaching the exit switch are admitted thereto in alternating relation, and collisions are prevented between a carrier which may be stopped to await entrance to the exit switch and a carrier approaching such stopped carrier. If two carriers on different tracks approach the exit switch substantially simultaneously, the carrier approaching the curved segment of the exit switch is given priority over the carrier approaching the straight segment of the exit switch. For example, a carrier on a branch track is admitted to an exit switch prior to a carrier on the track section 3.

The blocking system includes means for stopping a carrier approaching an exit switch when another carrier is about to enter the exit switch. When carriers are stopped under the above conditions, carriers approaching the rear of the stopped carriers are automatically stopped to prevent collisions. When a carrier has passed through the exit switch the blocking system is automatically conditioned so that a carrier awaiting entrance to the exit switch on a track other than that from which the first carrier has passed is allowed to pass through the exit switch.

Operation of the blocking system will be described for the conditions wherein a carrier on one track has assumed control and is admitted to the exit switch, and for the condition wherein a carrier on the other track has assumed control and is admitted to the exit switch. This description will be made with reference to FIG. 4 which illustrates details of a blocking system associated with the track switch 32 at the exit of the branch track 5.

A switch 57, positioned along the branch track 5 adjacent the entrance to the exit switch, is actuated by a carrier mounted actuator in response to movement of a carrier on branch track 5 toward the exit switch. The switch 57 includes normally open contacts 57–1 and 57–2 which are temporarily closed when the switch 57 is actuated by an actuator on the carrier. The closing of the contacts 57–1 effects energization of a coil 58 of a relay which corresponds to the relay having the coil 36 and which is included in a track switch control circuit corresponding to that shown in FIG. 2. When the relay coil 58 is energized the motor for the exit switch is energized to effect movement of the exit switch toward its curved track position in a direction from left to right, as viewed in FIG. 4. The exit switch includes a control switch 58′ in the circuit for the exit switch motor which control switch corresponds to the control switch 42 associated with the entrance switch.

The closing of contacts 57–2 results in energization of a latching coil 59L of a latch type relay 59 having also an unlatching coil 59U. The relay 59 includes normally closed contacts 59–1 and 59–2 in jumper circuits which supply electrical power to insulated blocking segments L2b and L3b of conductors L2 and L3 which segments are positioned in advance of the switch 57.

When the latching coil 59L is energized the contacts 59–1 and 59–2 open to deenergize the segments L2b and L3b so that a carrier approaching the rear of a carrier which has actuated switch 57 and which is awaiting entrance to the exit switch will be stopped by means of the deenergized segments L2b and L3b. As will presently appear, when a carrier has actuated the switch 57, such carrier is stopped at the entrance to the exit switch by deenergized blocking segments if the exit switch has not completed its shifting operation before a carrier reaches these blocking segments.

The exit switch includes a control switch 60 which is similar in construction and operation to the switch 49 described in connection with the entrance switch 24. The switch 60 includes contacts 60–1 which are open and contacts 60–2 which are closed when the exit switch is in its illustrated normal straight track position.

The normally open contacts 60–1 of the switch 60 are in series circuit with a coil 61 of a relay which has normally open contacts 61–1 and 61–2 included in jumper circuits which supply power to insulated segments L2c and L3c of conductors L2 and L3 which segments are positioned between the switch 57 and the track exit switch. When the track exit switch is in its illustrated normal straight track position or is moving toward curved track position, the coil 61 is deenergized and the contacts 61–1 and 61–2 are open so that the segments L2c and L3c are deenergized to stop a carrier approaching the exit switch on the branch track 5.

A coil 62 of a relay is normally energized through closed contacts 60–2 so that contacts 62–1 and 62–2 of this relay are normally closed to effect energization of insulated segments L2d and L3d of conductors L2 and L3 which segments are positioned along the main track section 3. This arrangement allows a carrier traveling along the track section 3 to pass through the exit switch when the exit switch is in its normal straight track position. When the exit switch begins to move toward its curved track position the contacts 60–2 open to deenergize the coil 62 which results in deenergization of the segments L2d and L3d for stopping a carrier on the track section 3 approaching the exit switch.

When the exit switch has completed movement to its curved track position as a result of actuation of the switch 57, contacts 60–1 of switch 60 close to effect energization of the coil 61. This closes contacts 61–1 and 61–2 and energizes the segments L2c and L3 to effect movement of a carrier through the exit switch onto the track section 3.

As a carrier from the branch track 5 exits from the exit switch and proceeds along the track section 3, a switch 63 having normally open contacts 63–1 is actuated by an actuator on such carrier to temporarily close contacts 63–1 which effect energization of a coil 64 of a relay including normally open contacts 64–1, 64–2 and 64–3. When the coil 64 is energized the contacts 64–1 close to effect energization of a coil 65 of a relay which corresponds to the relay having the coil 48 and which is included in a control circuit for the exit switch corresponding to the motor circuit shown in FIG. 2. This results in energization of the motor for the exit switch in the direction to move the exit switch toward its normal straight track position.

As the exit switch is moved toward straight track position the contacts 60–1 are opened to deenergize coil 61 to thereby deenergize the segments L2c and L3c which prevents a carrier on the branch track 5 from entering the exit switch while the exit switch is moving toward straight track position. Since contacts 60–2 remain open until the track exit switch has completed its return movement to straight track position, the segments L2d and L3d remain deenergized during this time preventing a carrier on the track section 3 in advance of the exit switch from entering this switch during movement of the exit switch.

When the coil 64 is energized the contacts 64–2 close to prepare for energization an unlatching coil 66U of a relay 66 having a latching coil 66L. The relay 66 includes normally closed contacts 66–1 and 66–2 in jumper circuits which supply power to insulated segments L2f and L3f of conductors L2 and L3 which segments are positioned in advance of the segments L2d and L3d. The relay 66 also has normally open contacts 66–3 in the circuit including the coil 59L.

When coil 64 is energized the contacts 64–3 are closed to energize the latching coil 67L of a relay 67 having an unlatching coil 67U. The relay 67 includes normally closed contacts 67–1 and 67–2 and normally open contacts 67–3. When the coil 67L is energized and the contacts 67–3 are closed an energizing circuit is prepared for a coil 68 of a relay having normally open contacts 68–1 and normally closed contacts 68–2 which have a delayed opening characteristic. Also, the contacts 67–1 and 67–2 open when the coil 67L is energized.

When the exit switch has completed movement to its straight track position the contacts 60–2 of the switch 60 are closed but the relay coil 62 is not energized at this time inasmuch as the contacts 67–2 of the relay 67 are now open. As a result, the segments L2d and L3d remain deenergized. At this time, also, the segments L2c and L3c are still deenergized since the contacts 60–1 are now open and the relay coil 61 cannot be energized.

When the contacts 60–2 switch 60 are closed the relay coil 68 is energized through the now closed contacts 67–3 to close contacts 68–1. When this occurs the coil 59U is energized and the contacts 59–1 and 59–2 are closed to effect energization of the segments L2b and L3b. If a carrier has been stopped by the previously deenergized segments L2b and L3b such carrier now moves toward the switch 57. At the same time, the coil 66U is energized through now closed contacts 60–2 and 64–2 so that the normally closed contacts 66–1 and 66–2 are closed if previously open to energize insulated segments L2f and L3f. If a carrier has been stopped by previously deenergized segments L2f and L3f such carrier now moves toward a switch 70 along the section 3. At the same time normally open contacts 66–3 are opened, but this has no effect.

As the carrier after exiting from the branch track 5 proceeds still further along the track section 3 an actuator mounted on such carrier actuates a switch 69 which temporarily closes its normally open contacts 69–1 to effect energization of the coil 67U which closes contacts 67–1 and 67–2 and opens contacts 67–3. When this occurs the relay coil 62 is energized to close contacts 62–1 and 62–2 which effects energization of the segments L2d and L3d so that if a carrier has been stopped by the previously deenergized segments L2d and L3d such carrier now passes through the straight section of the exit switch.

If a carrier had been stopped by the previously deenergized segments L2f and L3f, such carrier has now advanced to actuate switch 70 which closes contacts 70–1 temporarily to energize the coil 66L which opens contacts 66–1 and 66–2 to deenergize the segments L2f and L3f. This stops a carrier on the segments L2f and L3f behind the carrier which has actuated switch 70 and which is now approaching the segments L2d and L3d. When coil 66L is energized the contacts 66–3 are closed to energize the coil 59L to open contacts 59–1 and 59–2 and effect deenergization of the segments L2b and L3b.

The blocking system will now be described for the condition wherein a carrier on the track section 3 has assumed control and passes through the exit switch. It will be recalled that when the exit switch is in its normal straight track position the segments L2d and L3d are energized. If a carrier on the section 3 has actuated the switch 70 to effect deenergization of segments L2b and L3b before a carrier on branch track 5 has actuated the switch 57, then the carrier on section 3 may pass through the segments L2d and L3d and through the exit switch.

When a carrier on the section 3 has passed through the exit switch such carrier will actuate the switch 63 and the coil 64 is energized to effect energization of coil 65 of the track switch control relay. However, since the track switch is now in its straight track position it will not be moved when coil 65 is energized. At the same time, the coil 66U is energized to effect energization of the segments L2f and L3f which were previously deenergized upon actuation of the switch 70. If a carrier has been stopped by the segments L2f and L3f, such carrier now moves toward the switch 70.

The coil 67L is also energized when switch 63 is actuated which results in opening of contacts 67–2 and deenergization of the coil 62 which effects deenergization of the segments L2d and L3d. This stops a carrier on the section 3 at the entrance to the track switch after such carrier has actuated switch 70. At the same time, the coil 68 is energized through the now closed contacts 60–2 and 67–3 to effect energization of the coil 59U which results in energization of the segments L2b and L3b. This allows movement of a carrier on the branch track 5 to a position for actuating the switch 57.

As the carrier which has passed through the exit switch from the section 3 proceeds along the section 3 it actuates the switch 69 to effect energization of the coil 67U. This results in energization of the coil 62 through the now closed contacts 60–2 and 67–2 to effect energization of the segments L2d and L3d which allows a carrier stopped by the segments L2d and L3d to move through the exit switch. However, if a carrier has actuated switch 57 the exit switch starts to move and segments L2d and L3d cannot be energized.

It is thus seen that a carrier on the section 3 which passes through the exit switch initially conditions the system so that a carrier on the section 3 may actuate the switch 70 and that a carrier on the branch track 5 may actuate the switch 57. If at this time the carrier on the branch track 5 actuates the switch 57 prior to actuation of the switch 70 by a carrier on the section 3 the exit switch will be moved toward its curved track position and the carrier on the branch track 5 will receive priority, as previously described. However, if the carrier on the section 3 actuates the switch 70 prior to actuation of the switch 57 the carrier on the section 3 will receive priority.

If at the time the switch 69 is actuated, a carrier on the branch track 5 has not actuated the switch 57 then a carrier on the section 3 which has actuated the switch 70 will be admitted to the exit switch.

It has been demonstrated that if several carriers on the track section 3 and on the branch track 5 are awaiting passage through the track exit switch, the arrangement is such that first a branch track carrier will pass through the track exit switch and then a main track carrier will pass through the exit switch and then another branch carrier will be permitted passage through the exit switch, etc., in alternating relationship. However, in case of a branch track carrier and a main track carrier approaching the track exit switch substantially simultaneously, the branch track carrier will be given priority. The reason for this is that once the control switch 57 is actuated the track exit switch immediately begins its movement from straight track to curved track position and admission to the exit switch from the main track is automatically blocked, and when the exit switch reaches curved track position, the branch track carrier passes through the switch.

It is desirable that the control switch 57 be positioned far enough in front of the exit switch, if space permits, so that a carrier may pass through the exit switch from the branch track onto the main track without being stopped to await completion of movement of the exit switch. A carrier approaching the exit switch from the track section 3 may pass through the exit switch when such is in its normal straight track position without being stopped unless the switch 57 is actuated before such carrier reaches the exit switch.

From the foregoing description it is apparent that should a carrier on track section 3 actuate the switch 70 before a branch track carrier actuates the switch 57, but the branch track carrier coasts forward and actuates the switch 57 before the carrier on section 3 reaches the exit switch, the carrier on section 3 will be stopped because the exit switch has instantly begun its movement toward curved track position upon the switch 57 being actuated and the branch track carrier receives priority.

A blocking system has been described and shown in relation to a branch track and to the main track. It is understood that the same type of blocking system can also be constructed on the subbranch tracks 8 through 14 and the track 22'.

Figures 6, 7:
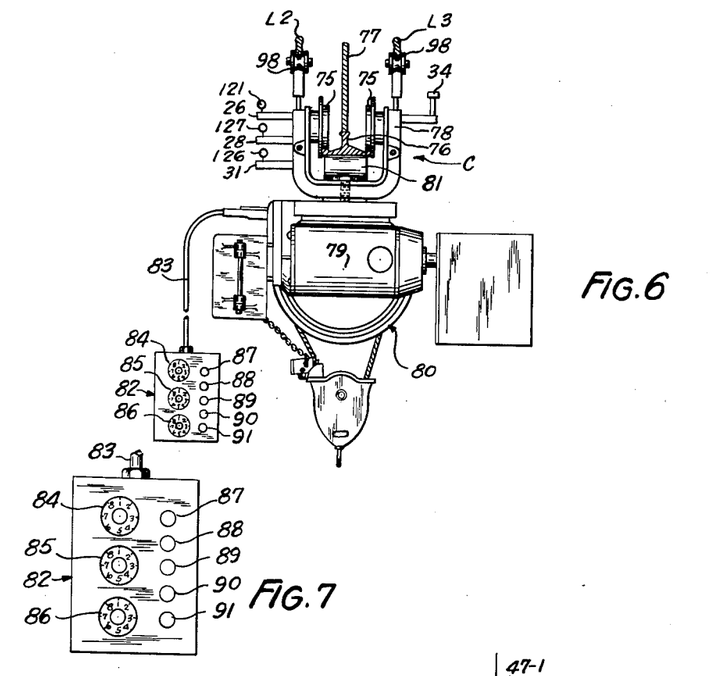
FIG. 6 is a sectional view of the system approximately on the line 6—6 of FIG. 1 and showing one of a plurality of self-propelled carriers of the system in end elevation.
FIG. 7 is an enlarged view of the operator's control panel depending from the carrier of FIG. 6.

Referring to FIG. 6, an automatically controlled self-propelled carrier C is shown for the purpose of illustrating the invention. Although a particular form of carrier is shown it is understood that other types of carriers may be employed. The carrier C includes a pair of wheels 75 adapted to bear upon parallel track surfaces of an inverted T-shaped monorail track 76 rigidly connected to and supported by a downwardly depending truss-like support 77. The wheels 75 are journalled in a U-shaped carrier frame 78 which forms a support for a carrier drive motor 79 and a motor driven hoist 80. The motor 79 is adapted to drive a drive wheel 81 supported by the frame 78 and bearing against the underside of the monorail 76 for propelling the carrier C therealong.

A control panel 82 is dependently supported from the carrier frame 78 by means of a generally L-shaped tubing 83. The panel 82 is provided with a branch track selector including a dial 84, a subbranch track selector including a dial 85 and a work station selector including a dial 86. The three selectors are settable by an operator for permitting the selection respectively of a branch track onto which a carrier is to be switched, a subbranch track onto which the carrier is to be switched from the selected branch track and a work station along the selected subbranch track at which the carrier is to be stopped. It is understood that an additional selector is required if subsubbranch tracks in the trackway are utilized. The control panel 82 also includes a plurality of push buttons 87, 88, 89, 90 and 91 to be actuated by an operator for purposes appearing hereinafter. These push buttons are of the spring return type which return to their normal positions when released by an operator.

Figure 8:
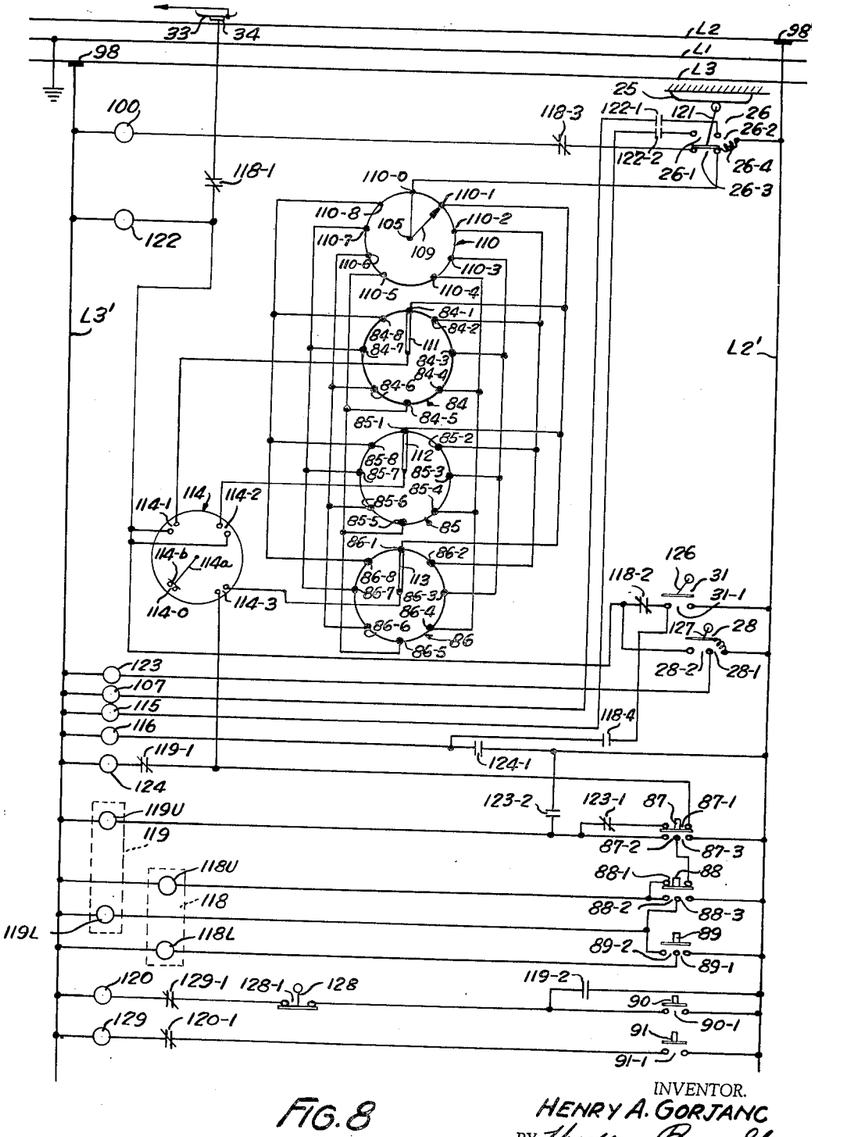
FIG. 8 is an across-the-line electrical diagram of an automatic control circuit incorporated in the carrier of FIG. 6.

In FIG. 6 the frame 78 is shown supporting the switches 26, 28 and 31 in vertically spaced relation so that these switches may be actuated respectively by the trippers 25, 27 and 30 which are positioned along the trackway in vertically spaced planes. The motor 79 is energized from the electrical conductors L2 and L3 in a conventional manner with the current being collected by two rollers contactors 98 on the carrier which contact conductors L2 and L3. The automatic control system mounted on the carrier C is shown in FIG. 8, and includes the branch track selector, the subbranch track selector, and the work station selector.

A counting device is mounted on the carrier for counting the control areas as the carrier travels along the trackway. This device is schematically shown in FIG. 9 and is preferably in the form of a stepping relay. A stepping relay 99 suitable for use in the present invention is illustrated in FIG. 9 but it is to be understood that other stepping relay constructions may be employed.

The stepping relay 99 comprises a count coil 100 associated with an armature 101 movable by electrically energizing the count coil 100. The armature 101 is mechanically connected to a lever 102 which carries a pawl 103 associated with a ratchet wheel 104 for indexing the wheel clockwise on its central shaft 105 against the action of a torsion spring (not shown) as viewed in FIG. 9. A second pawl 106 engages the ratchet wheel 104 and acts as a brake for preventing backward movement of the wheel 104 under the uncoiling action of the torsion spring (not shown) until a reset coil 107 is energized and urges its armature 108 outwardly to the right for releasing the brake pawl 106 and permitting the ratchet wheel 104 to be reset under the unwinding action of the torsion spring (not shown).

An electroconductive arm 109 (FIG. 9) mounted on the shaft 105 turns therewith to successively engage electrical contacts 110-0 through 110-8 angularly spaced on a stationary dial 110. The contact 110-0 on the dial 110 is electrically connected to the arm 109. As will presently appear, the relay 99 is stepped one contact when the carrier arrives at each control area, and is reset for reuse after being stepped a selected number of times. The resetting feature permits provision of a number of contacts on the dial 110 which is less than the total number of control areas in the groups of control areas encountered by a carrier as it travels along the trackway toward a selected work station.

Referring to FIG. 8, each of the dials 84 through 86 in the illustrated embodiment has eight electrical contacts 84–1 through 84–8, 85–1 through 85–8 and 86–1 through 86–8, respectively, which are spaced angular about the axis of the associated dials. Corresponding ones of these contacts are connected to one another and are connected to corresponding contacts on the dial 110 of the relay 99. The contacts on the dials 84 through 86 represent respectively the number of branch tracks, subbranch tracks and work stations along the subbranch tracks in the trackway. For example, the contacts on the dial 84 represent eight branch tracks in a trackway although only two branch tracks are shown. In a similar manner, the contacts on the dial 85 represent eight subbranch tracks and the contacts on the dial 86 represent eight work stations along a particular subbranch track. The contact 84–1 on the dial 84 represents the first branch track encountered by a carrier as it leaves the loading station, the contact 84–2 represents the second branch track so encountered, and so forth.

The dials 84 through 86 include respectively manually settable electroconductive contacts arms 111 through 113 which are mounted for rotation about the axes of the associated dials to successively engage the contacts thereon. The arms 111 through 113 are connected respectively to contacts of pairs of contacts 114–1, 114–2 and 114–3 on a dial 114 of a carrier mounted group selecting relay employed to select the group of control areas to be counted by the relay 99. The group selecting relay also includes a pair of contacts 114–0 on dial 114, a count coil 115, a reset coil 116 and an electroconductive arm 114a which is movable relative to the contacts 114–0, 114–1, 114–2 and 114–3 and which has a contact 114b adapted to engage both contacts of each pair of contacts. Operation of the group selecting relay is similar to the operation of the previously described relay 99. The operation of the carrier system may now be described.

Let it be assumed that it is desired to send a carrier to the work station 7a from the loading station 23. As shown in FIG. 1, the station 7a is the first station along the subbranch track 7 which is the first subbranch track branching from the branch track 5, which is the first branch track encountered by the carrier as it moves from the loading station. To send a carrier to the station 7a an operator at the loading station sets the selector arms 111 through 113 so that these arms engage the contacts 84–1, 85–1 and 86–1 on the associated dials. These settings select counts of the control areas registered by the relay 99 and when the relay 99 has registered a count selected by one of the preselect devices, a track switch is operated or the carrier is stopped.

The operator actuates the push button 88 which may be of the spring return type and which has normally closed contacts 88–1 and normally open contacts 88–2 and 88–3. When this push button is actuated the contacts 88–2 and 88–3 are closed and an unlatching coil 118U of a latch type relay 118 is energized. The relay 118 includes also a latching coil 118L and normally closed contacts 118–1, 118–2 and 118–3 and normally open contacts 118–4. When the coil 118U is energized the contacts 118–1, 118–2 and 118–3 are closed and the contacts 118–4 are opened. The coils of the relay 118 as well as coils of other relays in FIG. 9 are connected for energization from conductors L2' and L3' which are connected to the contactors 98 on the carrier.

Actuation of the push button 88 also effects energization of a latching coil 119L of a latch type relay 119 having an unlatching coil 119U and having normally closed contacts 119–1 and normally open contacts 119–2. When the contacts 119–2 are closed the coil 120 of a motor control forward relay is energized, which results in energization of the carrier motor 79 so that the carrier proceeds to move in a forward direction from the loading station along the track section 2 toward the tripper 25 adjacent the entrance to the branch track 5.

As the carrier travels along the track section 2 the tripper 25 located at the entrance to the branch track 5 will actuate the carrier mounted switch 26 which has normally closed contacts 26–1 and 26–2 and normally open contacts 26–3 and 26–4. When switch 26 is actuated the contacts 26–3 and 26–4 are closed and the count coil 100 of the relay 99 is energized through the now closed contacts 118–3 to effect movement of the arm 109 from the contact 110–0 into engagement with the contact 110–1. Current also flows through the closed contacts 26–4, the contact 110–0, the arm 109, contacts 110–1 and 84–1, the arm 111, now closed contacts 114–1 on dial 114, closed contacts 118–1, the shoe 34 and a conductor segment 33 which is engaged by the shoe 34 at the same time switch 26 is actuated. When the segment 33 is energized the adjacent track entrance switch 24 is moved to its curved track position in the manner previously described and the carrier is admitted to the branch track 5. Operation of the group selecting relay is such that the contacts 114–1 are closed at this time, as will presently appear.

The contacts 26–3 and 26–4 of the switch 26 remain temporarily closed until the wheeled follower arm 121 passes off the tripper 25. During the time that the contacts 26–3 and 26–4 are closed current flows through the previously described circuit to energize the coil 122 of a relay having normally open contacts 122–1 and 122–2 which are closed when coil 122 is energized to initiate the procedure for resetting the relay 99. The relay having the coil 122 is of a delayed action type such that its contacts remain temporarily closed after the coil 122 has been deenergized as a result of opening of the contacts 26–3 and 26–4.

When the follower 121 is disengaged from the tripper 25 and the contacts 26–1 and 26–2 are closed the coils 107 and 115 are energized through the still closed contacts 122–1 and 122–2. When the reset coil 107 is energized the arm 109 of the relay 99 is moved from the contact 110–1 into engagement with the contact 110–0 so that the relay 99 is reset. When the count coil 115 is energized the arm 114a is moved so that the contacts 114–2 are closed by the contact 114b and the contacts 114–1 are opened. The carrier system is now prepared to count subbranch tracks along the branch track 5.

As the carrier moves along the branch track 5 the tripper 25 adjacent the entrance to the subbranch track 7 engages the follower 121 which actuates the switch 26 to close the contacts 26–3 and 26–4. When this occurs the coil 100 is energized and the arm 109 is moved into engagement with the contact 110–1. Current also flows through the arm 109, contacts 110–1 and 85–1, arm 112, now closed contacts 114–2, closed contacts 118–1, the shoe 34 and the segment 33 engaged thereby to effect movement of the entrance switch at the entrance to the subbranch track 7 to its curved track position. The carrier may now be admitted to the subbranch track 7.

At the same time, the relay 122 is energized so that its contacts 122–1 and 122–2 are closed to effect energization of the reset coil 107 and the count coil 115. Accordingly, the arm 109 is again moved into engagement with the contact 110–0 to effect resetting of the relay 99. When the count coil 115 is energized the arm 114a is moved so that contacts 114–2 are opened and contacts 114–3 are closed. The carrier system is now prepared to count the stations 7a through 7h.

As the carrier proceeds along the subbranch track 7 the tripper 25 adjacent that station 7a engages the follower 121 of the switch 26 to close the contacts 26–3 and 26–4. This results in energization of the coil 100 and movement of the arm 109 into engagement with the contact 110–1. Current also flows through the arm 109, contacts 110–1 and 86–1, arm 113, now closed contacts 114–3, normally closed contacts 87–1 of the push button 87, normally closed contacts 123–1 of a stop relay having a coil 123 and through the coil 119U of the relay 119. As will presently appear, the stop relay is effective when energized to stop the carrier and includes in addition to the normally closed contacts 123–1 normally open contacts 123–2.

When the coil 119U is energized the contacts 119–2 are opened to deenergize the relay coil 120 to stop the carrier at the station 7a. At the same time, the contacts 119–1 are closed and a coil 124 of a relay is energized. This relay also has normally open contacts 124–1 which are closed when coil 124 is energized to effect energization of the reset coil 116. When the coil 116 is energized the arm 114a is reset so that contact 114b engages contacts 114–0 and all of the contacts 114–1, 114–2 and 114–3 are open at this time. The carrier is now stopped at the station 7a and an operator at such station may load or unload the carrier or perform some other operation with respect thereto. It is noted that the relay 99 is not reset at this time and the arm 109 engages contact 110–1.

If an operator at the station 7a desires to send the carrier directly to the loading station 23 he actuates the push button 89 which has normally open contacts 89–1 and 89–2. When the push button 89 is depressed these contacts are closed, which effects energization of the coil 118L. This results in opening of the normally closed contacts 118–1, 118–2 and 118–3 and closing of the contacts 118–4. Opening of the contacts 118–1 prevents energization of the segment 33 adjacent to the tripper 30 as the carrier passes thereby on its way to the loading station so that the carrier will not be diverted onto the bypass track 29. In addition, opening of the contacts 118-3 prevents energization of the count coil 100 when the switch 26 is actuated by a tripper 25 if any such trippers are encountered as the carrier moves toward the loading station.

Actuation of the push button 89 also results in energization of the coil 119L which closes its contacts 119-2 to effect energization of the relay coil 120. The motor 79 is thereby energized and the carrier proceeds along the subbranch track 7 to the track section 22' and from the section 22' through an exit switch 32 onto the section 3.

As the carrier proceeds along the track section 3 the tripper 30 engages the follower 126 of the switch 31. When this occurs the contacts 31-1 are closed and the coil 116 is energized through now closed contacts 118-4 which results in resetting of arm 114a if not already reset. However, arm 114a has already been reset as previously described. Although the contacts 31-1 of switch 31 are closed, the segment 33 adjacent the entrance to the bypass track 29 is not energized, and the track entrance switch 24 at the entrance to the bypass track 29 is not moved from its normal straight track position inasmuch as the contacts 118-1 and 118-2 are open at this time. Consequently, the carrier proceeds through this entrance switch along the track section 3 and onto the section 4.

When the tripper 27 engages a follower 127 of the switch 28 the normally open contacts 28-1 and 28-2 of the switch 28 are closed. When this occurs the stop relay coil 123 is energized so that the contacts 123-1 are opened and the contacts 123-2 are closed. When the contacts 123-2 are closed the coil 119U is energized and the contacts 119-2 are opened to effect deenergization of the relay coil 120. As a result, the carrier is stopped at the loading station 23. The contacts 119-1 are closed but have no effect at this time.

Actuation of the switch 28 also results in energization of the relay coil 122 so that the contacts 122-1 and 122-2 are closed. When this occurs the coils 107 and 115 are energized through the now closed contacts 26-1 and 26-2 of the switch 26. When the coil 107 is energized the arm 109 is moved back to engage the contact 110-0 and the relay 99 is reset. When the coil 115 is energized the arm 114a is moved to close contacts 114-1. The carrier is now stopped at the loading station 23 and the control system is prepared for a subsequent carrier dispatching operation.

When the carrier is at a selected work station, such as the station 7a, and it is desired to send the carrier to another work station, the operator at the station 7a sets the arms 111 through 113 to engage selected ones of the associated contacts so that the carrier will proceed along the proper branch track and subbranch track to the selected work station. The operator then actuates the push button 88 which results in closing of the contacts 88-2 and 88-3 and energization of the coil 118U. If the relay 118 is in a latched condition energization of the coil 118U effects unlatching of the relay. At the same time, the coil 119L is energized and the contacts 119-2 are closed to effect energization of the carrier motor and the carrier proceeds along the subbranch track 7.

When the follower 121 of the switch 26 engages the trippers 25 located along the subbranch track 7, the switch 26 is repeatedly actuated and effects successive stepping of relay 99. The carrier is not stopped at any of the stations 7b through 7h, however, because contacts 114-3 are open at this time and coil 119U cannot be energized when switch 26 is actuated.

As the carrier proceeds along the track section 3, tripper 30 engages the follower 126 to actuate switch 31. This results in energization of the adjacent segment 33 through closed contacts 118-1 and 118-2. The track entrance switch at the entrance to the bypass track 29 is thereby moved to its curved position.

At the same time, the relay coil 122 is energized to effect energization of reset coil 107 so that the relay 99 is reset. Also, the count coil 115 is energized which results in closing of the contacts 114-1. The carrier now proceeds onto the track 29 to bypass the loading station and enters the track section 2 to approach the first tripper 25 with the control system in the same condition as if the carrier had started its movement from the loading station 23.

If desired, a switch 128 (FIG. 9) may be mounted on the front end of the carrier so that upon engagement of the carrier with an obstacle the switch 128 will be actuated to open its normally closed contacts 128-1 to effect deenergization of the relay coil 120 and stop the carrier.

Actuation of the push buttons 90 and 91 permits inching of the carrier respectively in forward or reverse directions. If the push button 90 is actuated the contacts 90-1 will be closed and the relay coil 120 energized. The carrier will then move forward until the push button 90 is released, at which time the carrier will be stopped. Operation of the push button 91 is similar to that of the push button 90 in that when it is actuated its contacts 91-1 close to effect energization of relay coil 129. The relay having the coil 120 also includes normally closed contacts 120-1 which are opened when the relay coil 120 is energized so that the relay coil 129 cannot be energized. Similarly, the relay including the coil 129 also includes normally closed contacts 129-1 which open when the relay coil 129 is energized to prevent energization of the relay coil 120. If desired, the relays 120 and 129 may also be mechanically interlocked.

The push button 87 includes normally closed contacts 87-1 and normally open contacts 87-2 and 87-3. When an operator actuates the push button 87 the contacts 87-2 and 87-3 are closed to effect energization of the coil 119U. When this occurs, the contacts 119-2 are opened so that the relay coil 120 cannot be energized to start movement of the carrier. When the push button 87 is actuated coil 118U is also energized through the closed contacts 87-3 and 88-1, but this has no effect on the operation of the system.

If a carrier is stopped at the loading station 23 and an operator actuates the push button 89 the carrier will proceed around the entire main track and return to the loading station and stop. The carrier will not be diverted onto a branch track inasmuch as the entrance switches 24 cannot be moved by reason of the contacts 118-1 being opened as a result of energization of the coil 118L when the push button 89 is actuated. This is a desirable feature in that congestion at the loading station may be avoided.

An improved carrier system has been described wherein a carrier may be selectively dispatched to any one of a plurality of stations along a trackway from any other station. The provision of a stepping relay for counting the control areas and means for resetting the relay each time a selected number of areas has been counted results in a simplified control system on the carrier of compact arrangement and with a minimum number of parts.

The described blocking systems control movement of a number of carriers in a manner such that the possibility of collisions between carriers is minimized and carriers are not admitted to a track switch until the track switch is properly positioned to receive the carriers. The blocking systems associated with the track exit switches allow carriers to pass through each exit switch in alternating relation whereby efficient routing of the carriers is realized and unnecessary delays in the arrival of carriers to their destinations are avoided.

Although the invention has been described with reference to certain specific embodiments thereof, numerous modifications are possible. As an illustration of possible modifications, in place of stopping of the carriers at a working station, some other carrier function or an off-track function may be automatically performed. In performing an off-track function controls similar to those employed at the switching stations 24 may be employed at the working stations. As a further modification an off-track function and/or another carrier function may be combined with the stopping of the carrier, for example, the carriers may be stopped, a carrier mounted hopper loaded and the carrier restarted automatically at one or more of the loading stations.

It is the intention to cover by the claims all modifications coming within the practice of those skilled in the art to which the invention belongs.

Having described my invention, I claim:

1. A carrier system comprising a closed loop trackway, a carrier supported on and movable along the trackway, a plurality of uncoded groups of control areas along the trackway at each of which areas a carrier controlling operation may be performed, said carrier encountering a plurality of said groups in sequence as it travels along the trackway, a single resettable stepping relay on said carrier for counting the control areas in each of said groups as the carrier travels along the trackway, said resettable stepping relay including a plurality of contacts, a conductive member movable from an initial position to engage the contacts, a stepping coil energizable to advance said member, means for holding the member in the position to which it is advanced when said stepping coil is de-energized, and a resetting coil energizable to reset said member to its initial position, control means on said carrier actuatable to effect energization of said stepping coil to advance said member, a separate uncoded tripper means at each of said control areas for actuating said control means to energize said stepping coil to progressively advance said member at each control area, a plurality of adjustable preselect devices on said carrier for selecting a separate count of control areas in each of said groups which said carrier progresses through and at which a carrier controlling operation is to be performed, each of said preselect devices including a plurality of contacts and a conductive member settable to engage a selected one of said contacts, corresponding contacts of said preselect devices and of said resettable stepping relay being electrically interconnected, actuated means for effecting a carrier controlling operation when the movable member of said stepping relay has been advanced to engage a contact corresponding to a selected contact of one of said preselect devices, control means operable to effect energization of said resetting coil each time the movable member of said stepping relay has been advanced to engage a contact corresponding to a selected contact of one of the preselect devices, and means for connecting said actuated means in circuit with individual ones of said preselect devices and operable to sequentially connect said preselect devices with said actuated means in response to energization of said control means.

2. A carrier system as defined in claim 1 wherein said last-named means include a resettable stepping relay having contacts connected to the settable members of said preselect devices and a movable conductive member operable to engage the contacts thereof and connect said contacts with said actuated means and said control relay means.

3. A carrier system as defined in claim 1 wherein said control means on said carrier actuatable to effect energization of said stepping coil of said resettable stepping relay comprises a switch on said carrier and having contacts which are closed at each of said control areas to energize said stepping coil and said separate uncoded tripper means at each of the control areas comprises a trip member cooperable with the switch means to effect closing of said contacts as the carrier moves through said control area.

4. A system as defined in claim 1 wherein said trackway includes a loading station from which said carrier may be dispatched to a selected station, and means on said carrier operable to cause said carrier to travel to said loading station and to prevent stepping of said stepping relay as the carrier travels to said loading station.

References Cited by the Examiner

UNITED STATES PATENTS

| | | | |
|---|---|---|---|
| Re. 21,488 | 6/40 | Haupt | 246—231 |
| 1,097,160 | 5/14 | Balzer | 246—32 |
| 1,286,707 | 12/18 | Michener | 246—242 |
| 1,381,317 | 6/21 | Loughridge | 104—88 |
| 1,986,634 | 1/35 | Hehre | 246—31 |
| 1,986,635 | 1/35 | Hehre | 246—31 |
| 2,201,013 | 5/40 | Rosenthal | 104—88 |
| 2,614,506 | 10/52 | Mullerheim | 104—88 |
| 2,688,934 | 9/54 | Quail | 104—88 |
| 2,714,355 | 8/55 | Benson | 104—88 |
| 2,803,333 | 8/57 | Freeman. | |
| 2,902,945 | 9/59 | Simon | 104—88 |
| 2,909,128 | 10/59 | Keen | 104—88 |
| 2,918,881 | 12/59 | Klamp | 104—88 |

EUGENE G. BOTZ, Primary Examiner.

JAMES S. SHANK, LEO QUACKENBUSH,
Examiners.